US009760069B2

(12) United States Patent
Betran Palomas

(10) Patent No.: US 9,760,069 B2
(45) Date of Patent: Sep. 12, 2017

(54) METHOD OF OPERATING A WIND FARM

(71) Applicant: ALSTOM RENOVABLES ESPAÑA, S.L., Barcelona (ES)

(72) Inventor: Jaume Betran Palomas, Sant Cugat del Vallès (ES)

(73) Assignee: ALSTOM Renewable Technologies, Grenoble (FR)

(*) Notice: Subject to any disclaimer, the term of this patent is extended or adjusted under 35 U.S.C. 154(b) by 654 days.

(21) Appl. No.: 14/150,623

(22) Filed: Jan. 8, 2014

(65) Prior Publication Data
US 2014/0207297 A1 Jul. 24, 2014

Related U.S. Application Data

(60) Provisional application No. 61/804,105, filed on Mar. 21, 2013.

(30) Foreign Application Priority Data

Jan. 21, 2013 (EP) .................................... 13382023

(51) Int. Cl.
F03D 7/04 (2006.01)
G05B 15/02 (2006.01)
F03D 7/02 (2006.01)

(52) U.S. Cl.
CPC ............ *G05B 15/02* (2013.01); *F03D 7/022* (2013.01); *F03D 7/048* (2013.01); *F05B 2270/331* (2013.01); *Y02E 10/723* (2013.01)

(58) Field of Classification Search
CPC ......... F03D 7/048; F03D 7/022; F03D 7/0232
See application file for complete search history.

(56) References Cited

U.S. PATENT DOCUMENTS

| 2006/0232073 | A1  | 10/2006 | Corten et al. |
| 2008/0317598 | A1* | 12/2008 | Barbu ................... F03D 7/022 416/9 |
| 2009/0099702 | A1  | 4/2009  | Vyas et al. |
| 2010/0087960 | A1  | 4/2010  | Hayashi et al. |
| 2010/0310372 | A1* | 12/2010 | Narasimalu ........... F03D 1/0675 416/23 |

FOREIGN PATENT DOCUMENTS

| WO | WO 2004/011799 | 2/2004 |
| WO | WO 2013/037374 | 3/2013 |

OTHER PUBLICATIONS

European Search Report for EP13382023, mailed Jan. 7, 2013, 9 pgs.

(Continued)

*Primary Examiner* — Craig Kim
*Assistant Examiner* — Michael Sehn
(74) *Attorney, Agent, or Firm* — Dority & Manning, P.A.

(57) ABSTRACT

Method of operating a wind farm comprising a plurality of wind turbines, each of the turbines having a plurality of blades, the method comprising determining a possible wake situation at a first wind turbine caused by a second wind turbine, the second wind turbine being located upstream of the first wind turbine, and individually adapting the blades of the second wind turbine such that a wake generated by the second wind turbine is deflected away from the first wind turbine.

13 Claims, 4 Drawing Sheets

(56) References Cited

OTHER PUBLICATIONS

Adaramola et al., "Experimental investigation of wake effects on wind turbine performance", Renewable Energy 36, pp. 2078-2086 (2011).
Parkin et al., "The application of PIV to the wake of a wind turbine in YAW", Int. Symp. On Particle Image Velocimetry No. 3, 8 pgs. (2001).

* cited by examiner

METHOD OF OPERATING A WIND FARM

This application claims the benefit of European Patent Application 13382023.3 filed on Jan. 21, 2013 and U.S. Provisional Patent Application Ser. No. 61/804,105 filed on Mar. 21, 2013, the contents of which are hereby incorporated by reference in their entirety for all purposes.

The present application relates to methods of operating a wind farm. The application further relates to systems suitable for carrying out such methods and to wind farms comprising such systems.

BACKGROUND ART

Modern wind turbines are commonly used to supply electricity into the electrical grid. Wind turbines generally comprise a rotor with a rotor hub and a plurality of blades. The rotor is set into rotation under the influence of the wind on the blades. The rotation of the rotor shaft drives the generator rotor either directly ("directly driven") or through the use of a gearbox. The operation of the generator produces the electricity to be supplied into the electrical grid.

Wind turbines are often grouped together in so-called wind farms. In a wind farm there may be a relatively short distance between wind turbines as a trade-off is made between available land and wind farm power production, i.e. number of wind turbines. The interaction of the wind with a first upstream wind turbine produces a wake including a blade tip vortex with high local air velocities. Such a wake may be projected onto a downstream second wind turbine located nearby. When the wake shed from a first wind turbine intersects with the swept area of a second wind turbine located downstream, it may cause high loads (particularly vibrations) in this wind turbine in case specific load mitigation strategies have been implemented. This phenomenon may cause a reduction of electrical power production. These unwanted effects are mainly induced by the high air speed that accompanies the vortexes generated, especially at the blade tips of the first wind turbine. High loads may increase fatigue. It is important to note that the definition of a wind turbine as an upstream wind turbine or a downstream wind turbine does not depend on the wind turbine itself but on the relative position of the wind turbines and on the wind direction.

Currently known wake management strategies are generally based on stopping either the first or the second wind turbine or on power curtailment of at least one of the first wind turbine and the second wind turbine. This strategy is activated when a predetermined wind direction, capable of generating wake effects, is sensed. Said predetermined directions are commonly defined beforehand on the basis of simulation analyses, which take into account both statistical wind data and arrangement of the wind turbines. The new operation regime is usually maintained until the wind direction changes to a safer situation in which there is no such potential wake situation. This strategy can negatively affect the total electrical power production of the wind farm as wind turbine power production is significantly reduced, if not completely eliminated, upon detection of certain wind conditions. Furthermore, said commonly used management strategies do not typically comprise any optimization to account for other specific conditions e.g. when the wind turbine potentially receiving the wake situation is already not operating.

Furthermore, increasing the distance between the wind turbines, such that a wake shed from a wind turbine located upstream under no circumstances intersects with the swept area of a wind turbine located downstream, may also be used as an additional method to mitigate wake effects. Nevertheless, this may not be possible in certain sites with specific constraints, as this strategy would require a larger area for installing the wind farm. Moreover, the electrical infrastructure, and thus the costs, would also be increased.

Other known wake management strategies are based on displacing the rotor plane either by yawing or tilting the wind turbines located upstream after detecting changes in the wind direction. Document WO2004011799, for example, discloses such strategies. However, systems for tilting a rotor are generally not provided on wind turbines and their implementation could be very costly. On the other hand, activation of the yaw system, which is indeed provided on wind turbines for alignment to varying wind directions, involves moving the entire nacelle, and rotor with blades, which correspond to a big mass and inertia. Significant power is needed to displace such a big mass, said power thus reducing overall efficiency of the wind turbine by reducing electrical energy fed into the grid. Besides, the use of the yaw system may be rather slow and, again, quite expensive.

Thus, there still exists a need to provide a method of operating a wind farm that at least partially reduces some of the aforementioned problems.

SUMMARY

In a first aspect a method of operating a wind farm is provided. The wind farm comprises a plurality of wind turbines, each of the turbines having a plurality of blades, and the method comprises determining a possible wake situation at a first wind turbine caused by a second wind turbine, the second wind turbine being located upstream of the first wind turbine. The method further comprises individually adapting the blades of the second wind turbine such that a wake generated by the second wind turbine is deflected at least partially away from the first wind turbine.

According to this aspect, once a wake situation is determined at a wind turbine located downstream, the blades of the wind turbine generating such a wake are individually adapted. Blade adaptation is dependent on each blade's angular position within the swept area. This way, conditions for blade and wind interaction are not homogenous over the complete swept area, thus creating an asymmetry in the rotor plane. The wake generated by said wind turbine can thus be deflected away from the swept area of the wind turbine located downstream. By adapting the blades individually, the asymmetry is created without displacing the whole rotor plane. Consequently, much lower inertias than those involved in prior-art methods need to be displaced, so that power requirements are significantly reduced and efficiency of the wind turbine may be increased. Furthermore, a substantially quicker response to varying wind conditions can be achieved. In addition, as the wake is deflected from the swept area of the wind turbine located downstream, stopping the wind turbines located upstream can be avoided, so that power production of the wind farm may thus be further increased.

In some embodiments, individually adapting the blades may comprise activating individual pitch systems, so that each blade is rotated about its longitudinal axis independently from the others. In others, it may comprise activating at least one active aerodynamic device provided on the blades. In some of these embodiments the active aerodynamic devices may be provided at a blade tip. By active aerodynamic devices should be understood any active device suitable for changing aerodynamic properties of a blade, for example at least one flap provided on a trailing edge section, a deformable trailing edge section, active hinged winglets or air jets. Active hinged winglets or air jets are especially suitable for being arranged at or near a blade tip area in order to effectively influence blade tip vortex generation. Activating a hinged winglet may comprise a downward or upward deflection with respect to the blade surface of the winglet. Activating an air jet may comprise air expulsion at one or more points of a blade surface to change the aerodynamic flow around the blade tip.

Combinations of these embodiments may also be possible. Activating any of these systems (or combinations thereof) requires substantially less power than that required for moving the whole rotor with blades overhung structure. It is thus faster and less expensive.

In some embodiments, determining a possible wake situation may comprise detecting an overloading condition at the wind turbine. This may be achieved by load sensors provided on the blades of the wind turbines. By determining loads directly at the blades receiving the wake, wake situations can be detected substantially in real time. Furthermore, uncertainties derived from estimating loads from wind conditions measurements can also be avoided. In some embodiments the sensors may be arranged in the vicinity of the blade tip. Information about the outer regions of the swept area can thus be obtained. This way, premature overloading can be detected as soon as a wake generated by an upstream wind turbine starts intersecting with the swept area of a downstream wind turbine.

In some cases, the wind turbines located downstream may generate a wake skew demand signal. In some of these cases, such a signal may be sent directly to the wind turbines located upstream, thus providing a more reliable communication. Nevertheless, in some other embodiments, the wake skew demand signal may be entered in a control system (e.g. a SCADA control system), which may send suitable signals to other wind turbines of the farm. In these embodiments, processing such signals may further be combined with historic information related to e.g. number of previous blade adaptations or accumulated time of operation under adapted blade conditions. This historic information can be useful in order to limit fatigue loads, as a wind turbine operating with blades adapted for wake deviation is likely to suffer larger loads than those suffered under normal, i.e. symmetric, operation. Consequently, a trade-off may be reached between load mitigation of the downstream wind turbine and excessive overloading of the upstream wind turbine.

In some embodiments, individually adapting the blades of the second wind turbine comprises adapting the blades to a first extent. Then, the method may further comprise receiving, from the first wind turbine, feedback on the wake situation at the first wind turbine after individually adapting the blades of the second wind turbine to a first extent and, if the wake situation persists, adapting the blades of the second wind turbine to a further extent. This way, the extent to which the blades of the second wind turbine are adapted may be controlled precisely, so that the blades are not adapted in an unnecessary manner. Adapting the blades of the second wind turbine may reduce its electrical power production, while to a certain extent increasing loads. By limiting the extent to which blades are adjusted, electrical power production may be optimized.

In another aspect, a system for operating a wind farm comprising a plurality of wind turbines is provided, each of which has a plurality of blades. The system may be configured to perform any of the methods substantially as hereinbefore described.

In some embodiments, the system may further comprise a communication system for sending the wake skew demand signal from the wind turbine located downstream directly to the wind turbine located upstream.

A further aspect provides a wind farm comprising a plurality of wind turbines, each of the turbines having a plurality of blades, and a system substantially as hereinbefore described.

Additional objects, advantages and features of embodiments of the present invention will become apparent to those skilled in the art upon examination of the description, or may be learned by practice of the invention.

BRIEF DESCRIPTION OF THE DRAWINGS

Particular embodiments of the present invention will be described in the following by way of non-limiting examples, with reference to the appended drawings, in which.

DETAILED DESCRIPTION OF EMBODIMENTS

Figure 1:
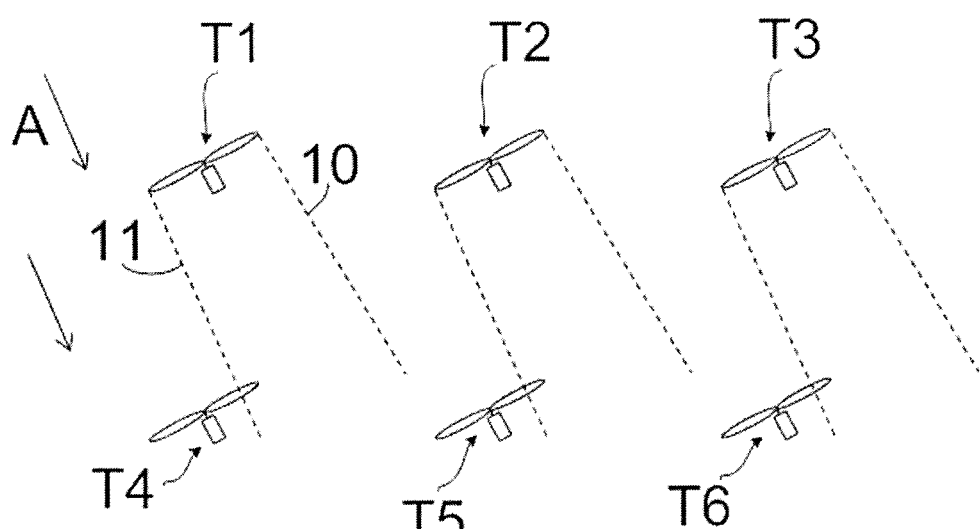
FIG. 1 shows a wind farm.

FIG. 1 shows a schematic representation of a wind farm comprising six wind turbines T1-T6 arranged in two rows, wherein three of them T1-T3 may be located upstream and the other three T4-T6 may be located downstream. Arrow A shows the wind direction and dashed lines 10, 11 schematically show the region affected by the wake generated by each wind turbine T1-T3 located upstream. In FIG. 1, due to the wind direction A, the wake of e.g. wind turbine T1, i.e. in the region of the dashed line 11, may intersect the swept area of wind turbine T4. It should be understood that the identification of T1-T3 as being located upstream and of T4-T6 as being located downstream depends on wind direction, so that these are only relative terms, which are applicable under certain conditions (arrow A). In particular, said identification would be reversed, i.e. T1-T3 located downstream and T4-T6 located upstream, if the wind direction were also reversed.

Figure 2:
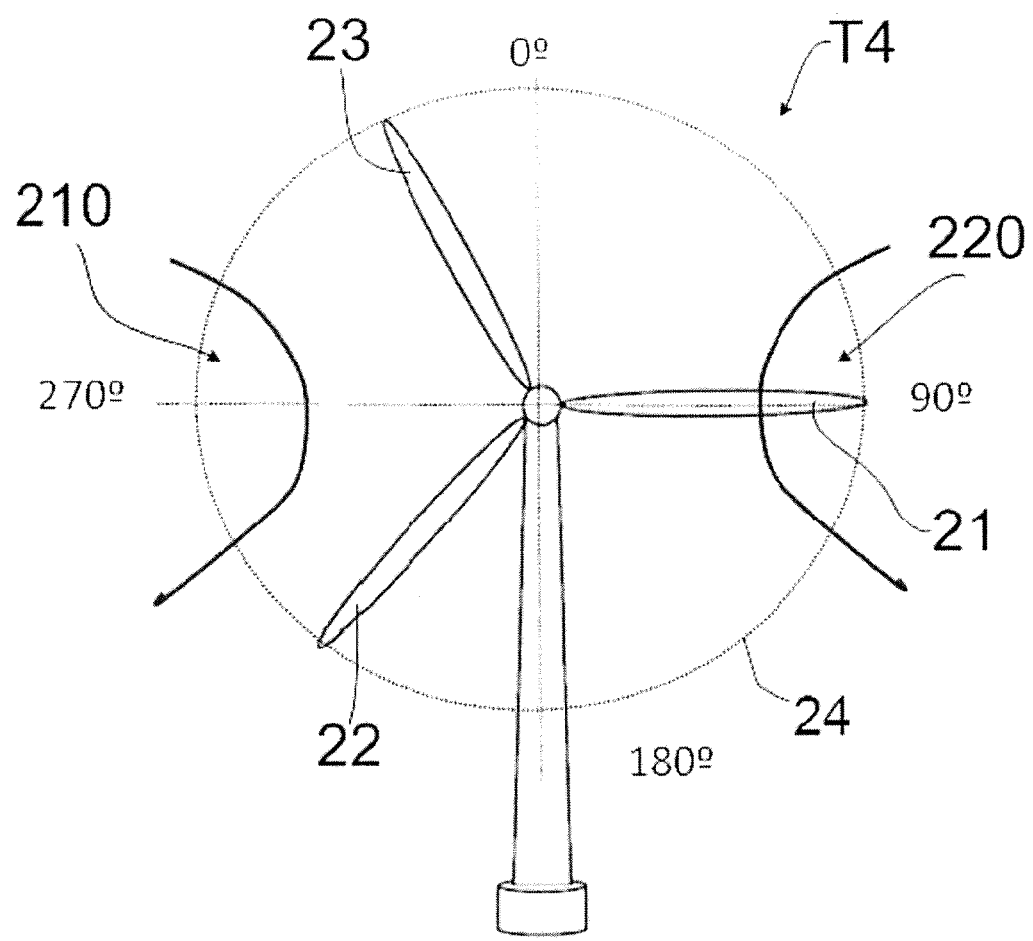
FIG. 2 shows a wind turbine located downstream from another wind turbine.
Figure 3:
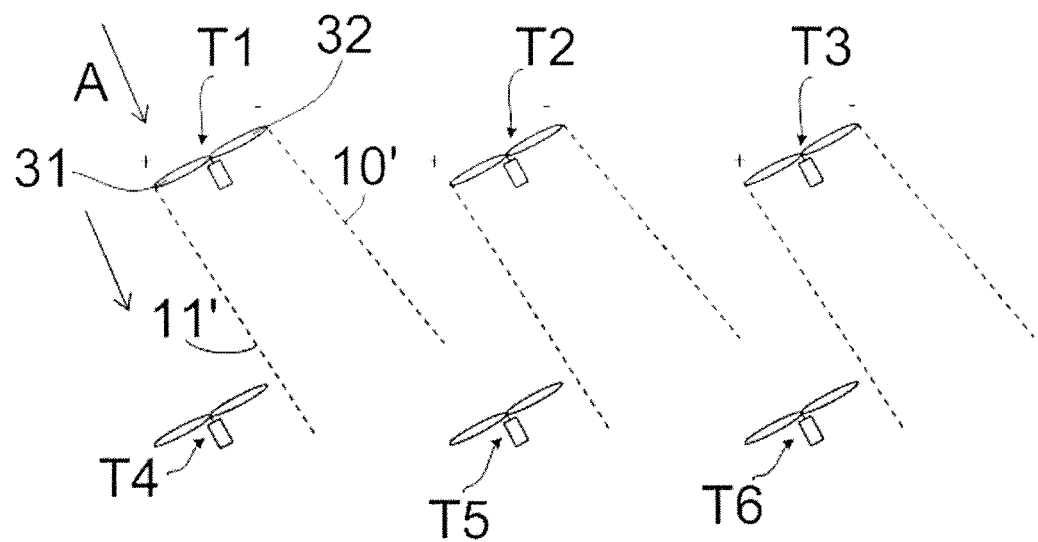
FIG. 3 illustrates an example of a method of operating a wind farm.

FIG. 2 shows a front view of a wind turbine located downstream, according to the scenario shown in FIG. 1, which may be in a wake situation, e.g. T4 of FIG. 1 or 3. Wind turbine T4 may comprise a rotor comprising three blades 21, 22 and 23. Rotation of the blades around the rotor may delimit a swept area 24. Vibrations and interferences occur especially when each of T4 blades passes along the area indicated by arrow 210, i.e. substantially at an azimuth position of 270° with respect to the vertical position, which is taken as 0°, and considering a clockwise rotation from the vertical.

During the initial stages of a wake situation, a curve showing the loads measured on the blades may have peaks occurring substantially at an azimuth position of 270°. In order to avoid confusions with other peaks derived e.g. from wind shear and from a blade passing in front of the tower, i.e. at 0° and 180° respectively, it would be advisable to have an azimuth sensor to detect the exact position of the blades and determine whether a peak results from a wake or from some other phenomena.

If the wind direction is different, peak loads may be initially detected e.g. at azimuth position 90°. As a general rule, wake induced loads will be initially measured at one side of the horizontal diameter of the swept area. That is, in general, higher loads will be measured either at the 90° or 270° regions depending on wind direction and wind farm layout.

Apart from sensors directly mounted on the blades, alternatively sensors may also be positioned at other suitable locations on the rotor or nacelle to measure and identify asymmetric blade loads.

In some implementations, the information provided by load sensors may be substituted with or complemented by information derived from a simulation of the performance of a wind farm. By knowing the (theoretical) lay-out of the wind farm, wake situations may be predicted for different wind directions.

FIG. 3 shows a schematic representation of a wind farm according to an embodiment. FIG. 3 differs from FIG. 1 in that the blades (only two of them are visible 31, 32) of any of the wind turbines T1-T3 located upstream have been individually adapted. This has been conceptually represented by plus and minus signs. The wake generated by such turbines, e.g. T1, has been deflected away from wind turbines located downstream, e.g. T4, as it has also been schematically represented by dashed lines 10' and 11'. Especially dashed line 11' shows the wake of T1 not intersecting with T4 swept area.

One might argue that deflection of the wake of T1 may mitigate loads on T4 but it may also increase loads on T5. Nevertheless, loads induced by a wake depend to a very large extent on wind turbine separation. Hence, even if the wake generated by T1 is indeed more directly oriented towards T5, this effect will not be critical provided the distance between T1 and T5 is large enough e.g. at least three rotor diameters, depending on the circumstances. Thus, most relevant wake effects do mainly involve short distance neighbours, so the application of the wake mitigation strategy between wind turbines with minimum separation within a wind farm is prioritized.

The signs plus and minus have been used to indicate that, for different blade positions, aerodynamic properties such as e.g. angle of attack or airfoil parameters such as chord length or airfoil chamber, may be varied i.e. increased or decreased in order to create an asymmetry at the rotor plane without having to displace the whole overhung structure. The angle of attack of a lifting body (in this case a blade) may be defined as the angle between a reference line of the blade (in this case the chord line) and a vector representing the relative motion between the blade and the fluid (oncoming air) through which it is moving.

In some embodiments, individually adapting the blades of the wind turbines located upstream means that they may be rotated substantially along their longitudinal axes i.e. by individual pitching mechanisms. In others, flaps may be provided along at least a portion of the trailing edge of the blades. The flap position corresponding to a plus sign as in FIG. 3 may correspond to a downward deflection of a flap, which increases the lift. In further embodiments, at least some portions of the trailing edge surfaces of the blades may be continuously deformable (DTE). In this case, a downward deformation of a trailing edge of an airfoil profile may correspond to a plus sign, whereas a minus sign may correspond to an upward deformation of the trailing edge. And in yet further embodiments the blades may combine both individual pitch mechanisms and flaps or a deformable trailing edge.

In some embodiments, each blade of a wind turbine located downstream may comprise at least one load sensor (not shown). This way, a wake situation may be detected substantially in real time and uncertainties derived from estimating loads from wind conditions measurements can also be avoided.

In some cases load sensors may be provided on other elements of the wind turbines e.g. the rotor. Alternative embodiments may determine a possible wake situation by detecting changes in the wind and verifying if said changes can theoretically generate a wake situation. It is also possible to combine all these alternatives.

Figure 4:
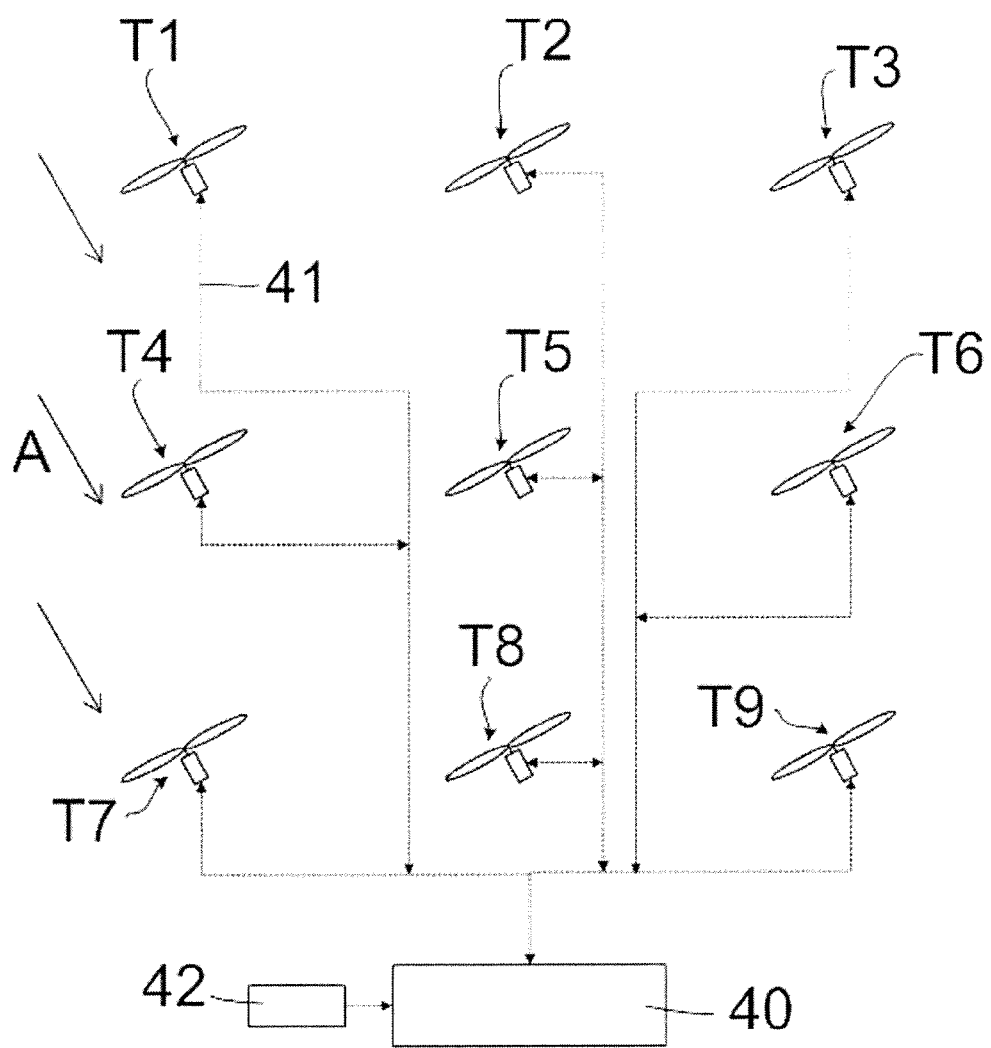
FIG. 4 illustrates an example of a wind farm.

FIG. 4 shows an embodiment of a wind farm comprising nine wind turbines T1-T9. According to this embodiment each wind turbine comprises at least one load sensor (not shown) provided e.g. on each blade. The wind farm may further comprise a control system 40, e.g. a SCADA control system, and a communication system represented by dashed lines 41 linking each wind turbine T1-T9 with the system 40. A weather vane 42 may further give information on wind conditions to the system 40. The system 40 may thus receive overloading conditions at any of the wind turbines located downstream and may send instructions to any of the wind turbines located upstream to adapt its blades individually such that their wakes are deflected from the swept area of the wind turbines located downstream. In other embodiments, the wind turbines located downstream may generate a wake skew demand signal. Such a signal may be sent to the system 40.

In some embodiments, a direct communication (not shown) in between wind turbines may be established. This way, wind turbines located downstream may send the wake skew demand directly to the wind turbines generating the wake.

Such a wake skew demand may comprise the information on the existence of the wake, and may also comprise information on the nature of the wake. For example, with reference to previous FIG. 2, a downstream wind turbine may indicate to a central control system or to an upstream wind turbine that high loads are being experienced e.g. at the 90° sector (see arrow 220). From this information, a central control system or a control system in an upstream wind turbine may deduct which turbine is causing a wake and in which direction a wake needs to be deflected.

A possible way of operating the wind farm is the following. In the upstream wind turbine, in a first sector of the swept area, the pitch angle is increased by e.g. 5 degrees and in another sector of the swept area, the pitch angle is decreased by 5 degrees. This may be sufficient to deflect the wake such that the downstream wind turbine is not affected anymore. On the other hand, the downstream wind turbine may indicate that it still experiences high loads. The upstream wind turbine may then increase the adaptation of the blades, so that in the first sector, the pitch angle is increased by e.g. 8 degrees, and in the other sector the pitch angle is decreased by the same amount. This process may be repeated until the pitch angle cycle reaches the point at which the wake is sufficiently deflected.

Also, in some examples, if the wake situation persists for a longer time, the decision may be taken by a control system to use the yaw system of a wind turbine instead of the individual adaptation of the blades or in complement to the individual adaptation of the blades.

Although only a number of particular embodiments and examples of the invention have been disclosed herein, it will be understood by those skilled in the art that other alternative embodiments and/or uses of the invention and obvious modifications and equivalents thereof are possible. Furthermore, the present invention covers all possible combinations of the particular embodiments described. Thus, the scope of the present invention should not be limited by particular embodiments, but should be determined only by a fair reading of the claims that follow.

The invention claimed is:

1. A method of operating a wind farm comprising a plurality of wind turbines, each of the turbines having a plurality of blades, the method comprising:
   determining a possible wake situation at a first wind turbine caused by a second wind turbine, the second wind turbine being located upstream of the first wind turbine,
      wherein the determining a possible wake situation comprises using one or more sensors directly mounted on the blades of the first wind turbine to detect azimuthal asymmetric loads on the blades generated by wake conditions on the blades as compared to other load inducing forces; and
   subsequent to and based on the detected azimuthal asymmetric loads at the first wind turbine, determining defined azimuth sectors that are less than a total sweep area of the blades of the second wind turbine that generate the detected asymmetric loads at the first wind turbine and individually adapting each of the blades of the second wind turbine in the defined azimuth sectors that are less than the total sweep area of the blades until a wake generated by the blades of the second wind turbine moving through the defined azimuth sector is deflected at least partially away from the first wind turbine.

2. The method of claim 1, wherein individually adapting the blades comprises activating individual pitch systems.

3. The method of claim 1, wherein individually adapting the blades comprises activating at least one active aerodynamic device provided on the blades.

4. The method of claim 3, wherein the at least one active aerodynamic device is provided at a blade tip.

5. The method of claim 3, wherein the at least one active aerodynamic device is provided at a blade tip.

6. The method of claim 3, wherein individually adapting the blades comprises activating at least one deformable trailing edge section of the blades.

7. The method of claim 1, wherein the first wind turbine generates a wake skew demand signal in response to a detected wake condition.

8. The method of claim 7, wherein the wake skew demand signal is sent directly to the second wind turbine.

9. The method of claim 1, wherein individually adapting the blades of the second wind turbine comprises adapting the blades to a first extent, the method further comprising receiving from the first wind turbine feedback on the wake situation at the first wind turbine after individually adapting the blades of the second wind turbine to the first extent and, if the wake situation persists, adapting the blades of the second wind turbine to a further extent.

10. The method of claim 9, further comprising activating a yaw system of the second wind turbine if the wake situation persists after the further extent.

11. A system for operating a wind farm comprising a plurality of wind turbines, each of the wind turbines having a plurality of blades, wherein the system is configured to perform a method according to claim 1.

12. The system of claim 11, further comprising a communication system for sending a wake skew demand signal from the first wind turbine directly to the second wind turbine.

13. A wind farm comprising a plurality of wind turbines, each of the wind turbines having a plurality of blades, wherein the wind farm further comprises a system according to claim 11.

* * * * *